United States Patent
Babar et al.

(10) Patent No.: US 12,018,101 B2
(45) Date of Patent: Jun. 25, 2024

(54) METHOD FOR PREPARING A POLYMER DISPERSION

(71) Applicant: Wacker Chemie AG, Munich (DE)

(72) Inventors: Muhammad Babar, Burghausen (DE); Bernhard Eckl, Burghausen (DE); Eric Frauendorfer, Burghausen (DE)

(73) Assignee: Wacker Chemie AG, Munich (DE)

(*) Notice: Subject to any disclaimer, the term of this patent is extended or adjusted under 35 U.S.C. 154(b) by 510 days.

(21) Appl. No.: 17/309,079

(22) PCT Filed: Jul. 25, 2019

(86) PCT No.: PCT/EP2019/070074
§ 371 (c)(1),
(2) Date: Apr. 21, 2021

(87) PCT Pub. No.: WO2021/013354
PCT Pub. Date: Jan. 28, 2021

(65) Prior Publication Data
US 2022/0017656 A1    Jan. 20, 2022

(51) Int. Cl.
C08F 6/00    (2006.01)
C08F 2/01    (2006.01)
C08F 2/22    (2006.01)
C08F 6/16    (2006.01)

(52) U.S. Cl.
CPC ............... *C08F 2/22* (2013.01); *C08F 2/01* (2013.01); *C08F 6/16* (2013.01)

(58) Field of Classification Search
CPC ...... C08F 6/00; C08F 6/16; C08F 2/01; C08F 2/22
See application file for complete search history.

(56) References Cited

U.S. PATENT DOCUMENTS

| | | |
|---|---|---|
| 5,698,666 A | 12/1997 | Burroway et al. |
| 2002/0165341 A1 | 11/2002 | Weitzel |
| 2007/0023340 A1 | 2/2007 | Lescoche |
| 2011/0112218 A1 | 5/2011 | Weitzel et al. |

FOREIGN PATENT DOCUMENTS

| | | |
|---|---|---|
| CN | 1487954 A | 4/2004 |
| CN | 103055583 A | 4/2013 |
| DE | 102007040850 A1 | 3/2009 |
| EP | 1215218 B1 | 9/2005 |
| JP | 2010037487 A | 2/2010 |
| WO | 15168801 A1 | 11/2015 |

OTHER PUBLICATIONS

Polymer Handbook 2nd Edition, JU. Wiley & Sons, New York (1975).
Fox T. G., Bull. Am. Physics Soc. 1, 3, p. 123 (1956).

*Primary Examiner* — Caixia Lu

(57) ABSTRACT

The present disclosure relates to a process and/or method for producing a polymer dispersion by free-radically initiated emulsion polymerization of radically polymerizable ethylenically unsaturated monomers within a polymerization reactor. The polymer dispersion obtained is transferred to a post-treatment reactor and is post-treated therein. The polymer dispersion within the post-treatment reactor is conveyed, simultaneously to the post-treatment, to a circuit for filtration and analysis and is then subsequently fed back into the post-treatment reactor.

12 Claims, 1 Drawing Sheet

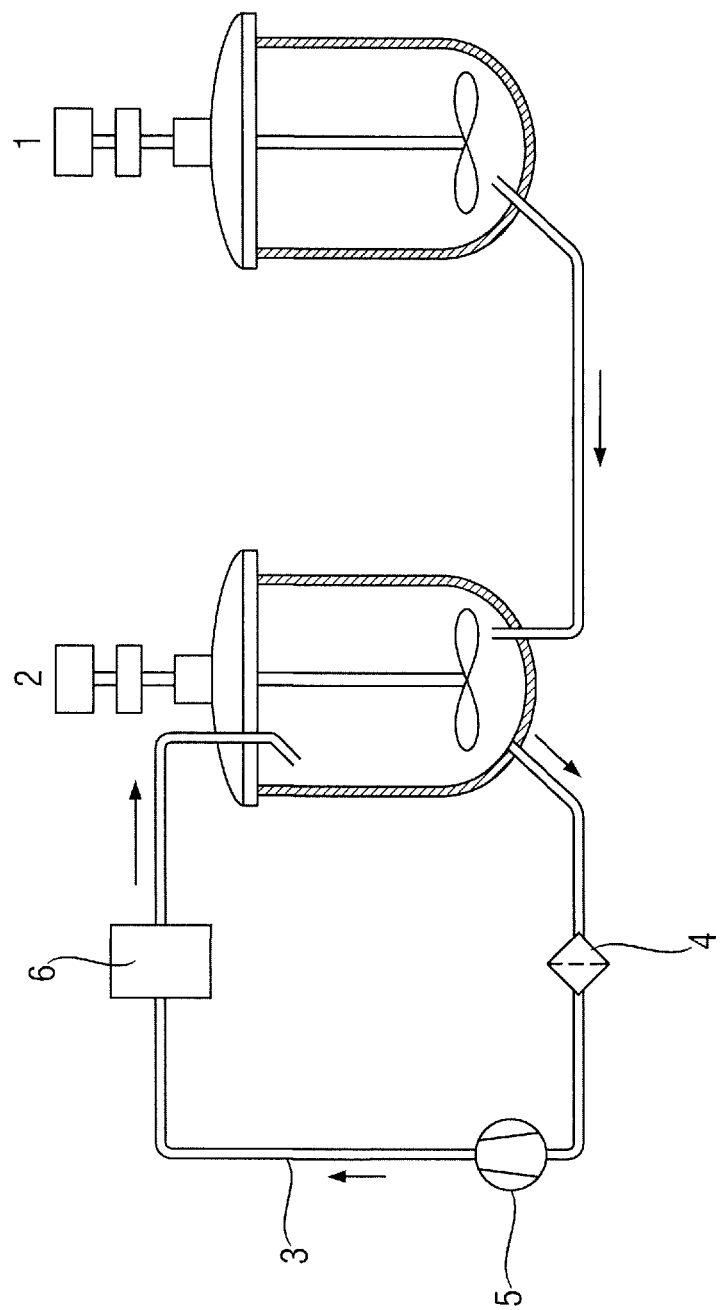

METHOD FOR PREPARING A POLYMER DISPERSION

CROSS-REFERENCE TO RELATED APPLICATIONS

This application is a U.S. National Phase application of PCT Application NO. PCT/EP2019/070074 filed on Jul. 25, 2019 the entire disclosure of which is incorporated by reference herein.

FIELD OF THE DISCLOSURE

The present disclosure relates to a method and process for producing a polymer dispersion, such as but not limited to an aqueous polymer dispersion, by of free-radically initiated emulsion polymerization of radically polymerizable ethylenically unsaturated monomers within a polymerization reactor.

BACKGROUND OF THE DISCLOSURE

Aqueous polymer dispersions are used as binders in a wide range of applications, for example in adhesives, coating applications, as binders in carpet, textile and paper applications, and in construction chemical products such as tile adhesives, renders and sealants. These aqueous dispersions are usually produced by aqueous emulsion polymerization, either batchwise (discontinuously) in stirred polymerization reactors or also continuously in stirred tank cascades. The polymer dispersions thus obtained generally have a solids content of 40 to 75% by weight and, due to the incomplete polymerization process, includes a proportion of non-polymerized monomers (residual monomers). Furthermore, the aqueous polymer dispersions produced by utilizing aqueous emulsion polymerization often have an undesirable proportion of polymer coagulates. Such coagulates lead to the formation of undesirable specks in polymer films obtained by the polymer dispersion and may lead to blockages in downstream processes.

Therefore, after the polymerization, the aqueous polymer dispersions are transferred to a degassing vessel, generally a stirred tank, and treated therein by physical and/or chemical methods. In the case of physical post-treatment, volatile constituents of the polymer dispersion are generally removed by passing through or passing over inert entrainment gases. For chemical post-treatment, post-polymerization is generally carried out in the presence of a redox combination of oxidation initiator and reduction initiator. To ensure product quality of the polymer dispersion, important product parameters such as for example viscosity, solids content, residual monomer content and VOC content are analyzed during and after the post-treatment. To remove polymer coagulates, the polymer dispersion is typically filtered when pumping out the process vessel described.

In the batchwise (discontinuous) production of aqueous polymer dispersions in stirred polymerization reactors, the post-treatment of the polymer dispersion obtained therewith is carried out after each batch and the polymer dispersion thus treated is then stored in a storage container. The aim here is to keep the time for the post-treatment as short as possible in order to keep the cycle time, that is to say to keep the time for polymerization and post-treatment and analysis during production as short as possible.

WO 2015/168801 A1 describes an external filter circuit for processing waste water or sludge from a bioreactor. US 2007/0023340 A1 describes a device for tangential filtration of a fluid to be processed which maintains good filtration flow despite its small size. CN 103055583 describes a filter circuit system for the filtration of powder paint. JP 2010037487 describes a filter circuit for purifying vinyl polymer.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 1 provides a schematic illustration of a device or assembly for carrying out the method and/or process for preparing the polymer dispersion described herein.

DETAILED DESCRIPTION

It is to be understood that the invention may assume various alternative orientations and step sequences, except where expressly specified to the contrary. It is also understood that the specific devices and/or processes illustrated in the attached drawings, and described in the specification are simply exemplary embodiments of the inventive concepts disclosed and defined herein. Hence, specific dimensions, directions or other physical characteristics relating to the various embodiments of the invention disclosed are not to be considered as limiting, unless expressly stated otherwise.

The object consisted of providing a process with which the time required for post-treatment and analysis of a polymer dispersion can be reduced.

The present disclosure relates to a process for producing a polymer dispersion, such as but not limited to an aqueous polymer dispersion, by utilizing free-radically initiated emulsion polymerization of radically polymerizable ethylenically unsaturated monomers in a polymerization reactor, wherein the polymer dispersion thus obtained is transferred to a post-treatment reactor and is post-treated therein by physical and/or chemical methods, characterized in that the polymer dispersion in the post-treatment reactor is conveyed, simultaneously to the post-treatment, to a circuit for filtration and analysis and is subsequently fed back to the post-treatment reactor.

The present disclosure further relates to a device for producing a polymer dispersion, such as but not limited to an aqueous polymer dispersion, by utilizing free-radically initiated emulsion polymerization of radically polymerizable ethylenically unsaturated monomers may include at least one polymerization reactor and at least one post-treatment reactor, characterized in that at least one post-treatment reactor is equipped with a circuit having one or more devices for conveying and filtration and analysis of the aqueous polymer dispersion.

Suitable polymerization reactors are known to those skilled in the art and are steel reactors of appropriate dimensions, which may be designed as pressure reactors or pressureless reactors, and are equipped with the usual stirring devices, heating and cooling systems, measurement and control devices, and also lines for feeding the reactants and discharging the products. Suitable post-treatment reactors are known to those skilled in the art and are steel reactors of appropriate dimensions, which are generally designed as pressureless reactors, and are equipped with the usual stirring devices, heating and cooling systems, measurement and control devices, and lines for feeding and discharge.

The process according to the invention can be carried out in the context of a discontinuous polymerization or in the context of a continuous polymerization. In the case of discontinuous polymerization, polymerization is carried out batchwise in a polymerization reactor and post-treatment batchwise in a post-treatment reactor. Continuous polymerization is carried out in at least two polymerization reactors connected in series and the product thus obtained is then continuously transferred to at least one post-treatment reactor and post-treated therein.

The post-treatment reactor(s) are each equipped with a circuit having one or more devices for conveying, filtering and analyzing the aqueous polymer dispersion.

The external circuit for filtration and analysis may include a pipeline of appropriate dimensions in which at least one pump and at least one filter device and at least one analysis device are integrated.

In general, the connection to the discharge of the polymer dispersion into the external circuit is located in the lower third of the post-treatment reactor, preferably at the bottom of the reactor. The connection for recycling of the polymer dispersion out of the external circuit into the post-treatment reactor is at a point different from the connection for discharge, preferably in the upper half of the reactor and particularly preferably in a tangential inlet or on the wall of the post-treatment reactor.

The pump type used is not critical. Suitable examples are free-flow pumps (vortex) or positive displacement pumps. Preference is given to positive displacement pumps, particular preference to rotary piston pumps or screw-spindle pumps. The hourly throughput depends on the dimensions of the post-treatment reactor and of the circuit. In general, the circuit is configured so that the flow rate (hourly throughput) is at least the liquid volume in the post-treatment reactor per hour, preferably at least twice this volume per hour. Typical values are in the range of approximately 1 to approximately 120 $m^3/h$, preferably approximately 40 to approximately 100 $m^3/h$, at a polymerization reactor volume of approximately 15 to approximately 60 $m^3$. In the case of reactors on a pilot plant scale or laboratory scale, the hourly throughputs are correspondingly lower.

Suitable filters are screen basket filters, bag filters, perforated metal cylinder filters and other types of filters that filter on the basis of size exclusion. Preferred filters are automatic cleaning filters, particular preference being given to automatic cleaning perforated metal cylinder filters. Mesh sizes used are generally 50 to 1000 µm. Preference is given to mesh sizes 150 to 700 µm. The respective mesh size depends on the intended further use of the polymer dispersion.

The filter unit can be arranged in the external circuit upstream of the pump in the direction of flow, between the outlet of the post-treatment reactor and the pump, or downstream of the pump in the direction of flow. The filter unit is preferably located in the external circuit upstream of the pump in the direction of flow. The filter unit is particularly preferably located upstream of possible analytical devices.

To analyze the properties of the polymer dispersion, one or more of the devices listed below are used as analytical devices: spectrometers for spectroscopic measuring methods, for example to determine the mean particle size using near-infrared spectroscopy, viscometers such as differential pressure rheometers or online Brookfield viscometers for viscometric measurements, measuring instruments for measuring redox potential and pH, density measuring instruments, Coriolis mass flow meters or radiometric measuring instruments (gamma emitters), measuring instruments for determining the molar mass (Mw), or microwave sensors for determining the solids content. One or more measuring instruments may be used including but not limited to spectrometers, viscometers, pH meters, Coriolis mass flow meters, radiometric measuring instruments, microwave sensors and density measuring instruments are preferably used in the analytical device. Preferably measured in the analytical device are one or more product properties including but not limited to mean particle size, molar mass, solids content, viscosity, VOC content (VOC=volatile organic compound), residual monomer content, redox potential and pH.

The measured values are preferably forwarded online to a control room for monitoring and controlling the polymerization plant. From there, if required, measures to adjust the desired product properties can be initiated.

In the process for preparing a polymer dispersion by emulsion polymerization, any ethylenically unsaturated monomers can be polymerized in an aqueous medium and in the presence of any protective colloids and/or emulsifiers and by utilization of radical initiation.

The ethylenically unsaturated monomers may be preferably selected from the group including vinyl esters, (meth) acrylic esters, vinyl aromatics, olefins, 1,3-dienes and vinyl halides and optionally other monomers that are copolymerizable therewith.

Suitable vinyl esters are those of carboxylic acids having 1 to 15 carbon atoms. Preference is given to vinyl acetate, vinyl propionate, vinyl butyrate, vinyl 2-ethylhexanoate, vinyl laurate, 1-methylvinyl acetate, vinyl pivalate, and vinyl esters of alpha-branched monocarboxylic acids having 9 to 11 carbon atoms, for example VeoVa9® or VeoVa10® (trade names of Hexion). Particular preference is given to vinyl acetate.

Suitable monomers from the group of acrylic esters or methacrylic esters are, for example, esters of unbranched or branched alcohols having 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, t-butyl acrylate, t-butyl methacrylate, 2-ethylhexyl acrylate. Particular preference is given to methyl acrylate, methyl methacrylate, n-butyl acrylate, t-butyl acrylate and 2-ethylhexyl acrylate.

Preferred vinyl aromatics are styrene, methylstyrene and vinyltoluene. The preferred vinyl halide is vinyl chloride. Preferred olefins are ethylene, propylene and preferred dienes are 1,3-butadiene and isoprene.

Optionally, from 0 to 10% by weight, based on the total weight of the monomer mixture, of auxiliary monomers can also be copolymerized. Preference is given to using 0.1 to 5% by weight auxiliary monomers. Examples of auxiliary monomers are ethylenically unsaturated mono- and dicarboxylic acids, preferably acrylic acid, methacrylic acid, fumaric acid and maleic acid; ethylenically unsaturated carboxamides and carbonitriles, preferably acrylamide and acrylonitrile; mono- and diesters of fumaric acid and maleic acid such as the diethyl and diisopropyl esters, and also maleic anhydride; ethylenically unsaturated sulfonic acids and salts thereof, preferably vinylsulfonic acid, 2-acrylamido-2-methylpropanesulfonic acid. Further examples are pre-crosslinking comonomers such as polyethylenically unsaturated comonomers, for example diallyl phthalate, divinyl adipate, diallyl maleate, allyl methacrylate or triallyl cyanurate, or post-crosslinking comonomers, for example acrylamidoglycolic acid (AGA), methyl methylacrylamidoglycolate (MAGME), N-methylolacrylamide (NMA), N-methylolmethacrylamide, N-methylol allylcarbamate, alkyl ethers such as the isobutoxy ether or esters of N-methylolacrylamide, of N-methylolmethacrylamide and of N-methylol allylcarbamate. Also suitable are epoxide-functional comonomers such as glycidyl methacrylate and glycidyl acrylate. Further examples are silicon-functional comonomers, such as acryloxypropyltri(alkoxy)- and methacryloxypropyltri(alkoxy)silanes, vinyltrialkoxysilanes and vinylmethyldialkoxysilanes, in which methoxy, ethoxy and ethoxypropylene glycol ether radicals for example may be present as alkoxy groups. Also included are monomers having hydroxy or CO groups, for example hydroxyalkyl esters of methacrylic acid and acrylic acid such as hydroxyethyl, hydroxypropyl or hydroxybutyl acrylate or methacrylate and also compounds such as diacetone acrylamide and acetylacetoxyethyl acrylate.

Particular preference is given to monomer mixtures of vinyl acetate with 1 to 50% by weight ethylene; monomer mixtures of vinyl acetate with 1 to 50% by weight ethylene and 1 to 50% by weight of one or more further comonomers from the group of vinyl esters having 3 to 12 carbon atoms in the carboxylic acid radical, such as vinyl propionate, vinyl laurate, and vinyl esters of alpha-branched carboxylic acids having 9 to 11 carbon atoms such as VeoVa9®, VeoVa10®; monomer mixtures of one or more vinyl esters, 1 to 50% by weight ethylene and preferably 1 to 60% by weight (meth) acrylic esters of unbranched or branched alcohols having 1 to 15 carbon atoms, in particular n-butyl acrylate or 2 ethylhexyl acrylate; monomer mixtures with 30 to 75% by weight vinyl acetate, 1 to 30% by weight vinyl laurate or vinyl esters of an alpha-branched carboxylic acid having 9 to 11 carbon atoms, and also 1 to 30% by weight (meth) acrylic esters of unbranched or branched alcohols having 1 to 15 carbon atoms, in particular n-butyl acrylate or 2-ethylhexyl acrylate, which may also include 1 to 40% by weight ethylene; monomer mixtures with one or more vinyl esters, 1 to 50% by weight ethylene and 1 to 60% by weight vinyl chloride; wherein the monomer mixtures mentioned may also include in each case the auxiliary monomers mentioned in the amounts cited, and the figures in % by weight in each case add up to 100% by weight.

Particular preference is also given to (meth)acrylic ester monomer mixtures, such as monomer mixtures of n-butyl acrylate or 2-ethylhexyl acrylate or mixtures of methyl methacrylate with n-butyl acrylate and/or 2-ethylhexyl acrylate; styrene-acrylic ester monomer mixtures with one or more monomers from the group comprising methyl acrylate, ethyl acrylate, propyl acrylate, n-butyl acrylate, 2-ethylhexyl acrylate; vinyl acetate-acrylic ester monomer mixtures with one or more monomers from the group comprising methyl acrylate, ethyl acrylate, propyl acrylate, n-butyl acrylate, 2-ethylhexyl acrylate and optionally ethylene; styrene-1,3-butadiene monomer mixtures; wherein the monomer mixtures mentioned may also include auxiliary monomers in the amounts mentioned, and the figures in % by weight in each case add up to 100% by weight.

Examples of particularly preferred comonomers for vinyl chloride monomer mixtures are α-olefins such as ethylene and propylene, vinyl esters such as vinyl acetate, acrylic esters and methacrylic esters of alcohols having 1 to 15 carbon atoms, such as methyl acrylate, methyl methacrylate, ethyl acrylate, ethyl methacrylate, propyl acrylate, propyl methacrylate, n-butyl acrylate, t-butyl acrylate, n-butyl methacrylate, t-butyl methacrylate, 2-ethylhexyl acrylate, fumaric and maleic acid mono- or diesters such as the dimethyl and diethyl esters of maleic acid and fumaric acid.

Most preferred are monomer mixtures with vinyl acetate and 5 to 50% by weight ethylene; monomer mixtures with vinyl acetate and 1 to 50% by weight ethylene and 1 to 50% by weight of a vinyl ester of a-branched monocarboxylic acids having 9 to 11 carbon atoms; monomer mixtures with 30 to 75% by weight vinyl acetate, 1 to 30% by weight vinyl laurate or a vinyl ester of an a-branched carboxylic acid having 9 to 11 carbon atoms, and also 1 to 30% by weight (meth)acrylic esters of unbranched or branched alcohols having 1 to 15 carbon atoms, which optionally may also include 1 to 40% by weight ethylene; monomer mixtures with vinyl acetate, 5 to 50% by weight ethylene and 1 to 60% by weight vinyl chloride; and monomer mixtures having approximately 60 to 98% by weight vinyl chloride and 1 to 40% by weight ethylene, wherein the monomer mixtures in each case may also include auxiliary monomers in the amounts mentioned, and the figures in % by weight in each case add up to 100% by weight.

The monomer selection and the selection of the proportions by weight of the comonomers is generally made so as to result in a glass transition temperature Tg of approximately −50° C. to approximately +50° C., preferably approximately −20° C. to approximately +30° C.

The glass transition temperature Tg of the polymers may be determined in a known manner by DSC (Differential Scanning calorimetry, DIN EN ISO 11357-1/2), for example using the differential scanning calorimeter DSC1 from Mettler-Toledo in an open crucible at a heating rate of approximately 10 K/min. The temperature at the midpoint of the step (midpoint=half the step height of the heat flow step) of the second heating curve is evaluated as the glass transition temperature in the plot of heat flow. The approximate Tg can also be predetermined using the Fox equation. According to Fox T. G., Bull. Am. Physics Soc. 1, 3, page 123 (1956): $1/Tg=x1/Tg1+x2/Tg2+ \ldots +xn/Tgn$, where xn is the mass fraction (wt %/100) of the monomer n and Tgn is the glass transition temperature in Kelvin of the homopolymer of the monomer n. Tg values for homopolymers are listed in Polymer Handbook 2nd Edition, JU. Wiley & Sons, New York (1975).

The polymerization is effected under conditions typical for emulsion polymerization. The polymerization temperature is preferably between approximately 50° C. and approximately 110° C. The pressure depends on whether the monomers to be polymerized are liquid or gaseous at the particular polymerization temperature and is preferably approximately 1 to approximately 110 $bar_{abs}$. In the copolymerization of gaseous comonomers such as ethylene, 1,3-butadiene or vinyl chloride, polymerization takes place under pressure, and particularly preferably approximately 10 to approximately 80 $bar_{abs}$.

The polymerization is initiated with the redox initiator combinations of oxidation initiator and reduction initiator customary for emulsion polymerization. Examples of suitable oxidation initiators are the sodium, potassium and ammonium salts of peroxodisulfuric acid, hydrogen peroxide, t-butyl peroxide, t-butyl hydroperoxide, potassium peroxodiphosphate, tert-butyl peroxopivalate, cumene hydroperoxide, isopropylbenzene monohydroperoxide, azobisisobutyronitrile. Preference is given to the sodium, potassium and ammonium salts of peroxodisulfuric acid and hydrogen peroxide. The initiators mentioned are generally used in an amount of approximately 0.01 to approximately 2.0% by weight, based on the total weight of the monomers.

Suitable reduction initiators are the sulfites and bisulfites of alkali metals and of ammonium, for example sodium sulfite, the derivatives of sulfoxylic acid such as zinc or alkali metal formaldehyde sulfoxylates, for example sodium hydroxymethanesulfinate (Bruggolite) and ascorbic acid, isoascorbic acid or salts thereof; or formaldehyde-free reducing agents such as 2-hydroxy-2-sulfinato acetic acid disodium salt (Bruggolite FF6). The amount of reducing agent is preferably approximately 0.015 to approximately 3% by weight, based on the total weight of the monomers.

The oxidizing agents mentioned, in particular the salts of peroxodisulfuric acid, can also be used on their own as thermal initiators.

Chain transfer agents may be used to control the molecular weight during the polymerization. If such agents are used, they are normally used in amounts of between approximately 0.01 to approximately 5.0% by weight based on the monomers undergoing polymerization and are metered in separately or else premixed with reaction components. Examples of such agents are n-dodecyl mercaptan, tert-dodecyl mercaptan, mercaptopropionic acid, methyl mercaptopropionate, isopropanol, and acetaldehyde. Preferably, no chain transfer agents are used.

Suitable protective colloids are fully saponified or partially saponified polyvinyl alcohols; polyvinyl acetals; polyvinylpyrrolidones; polysaccharides in water-soluble form, such as starches (amylose and amylopectin), celluloses and the carboxymethyl, methyl, hydroxyethyl, hydroxypropyl derivatives thereof; proteins such as casein or caseinate, soya protein, gelatin; lignosulfonates; synthetic polymers such as poly(meth)acrylic acid, copolymers of (meth)acrylates with carboxy-functional comonomer units, poly(meth)acrylamide, polyvinylsulfonic acids and the water-soluble copolymers thereof; melamine-formaldehydesulfonates, naphthalene-formaldehydesulfonates, styrene-maleic acid and vinyl ether-maleic acid copolymers.

Preferred protective colloids are partially saponified or fully saponified polyvinyl alcohols. Preference is given to partially saponified polyvinyl alcohols having a degree of hydrolysis of approximately 80 to approximately 95 mol % and a Höppler viscosity in approximately 4% aqueous solution of approximately 1 to approximately 30 mPas (Höppler method at 20° C., DIN 53015). Preference is also given to partially saponified, hydrophobically modified polyvinyl alcohols having a degree of hydrolysis of approximately 80 to approximately 95 mol % and a Höppler viscosity in approximately 4% aqueous solution of approximately 1 to approximately 30 mPas. Examples of these are partially saponified copolymers of vinyl acetate with hydrophobic comonomers such as isopropenyl acetate, vinyl pivalate, vinyl ethylhexanoate, vinyl esters of saturated alpha-branched monocarboxylic acids having 5 or 9 to 11 carbon atoms, dialkyl maleates and dialkyl fumarates such as diisopropyl maleate and diisopropyl fumarate, vinyl chloride, vinyl alkyl ethers such as vinyl butyl ether, olefins such as ethene and decene. The proportion of hydrophobic units is preferably approximately 0.1 to approximately 10% by weight based on the total weight of the partially saponified polyvinyl alcohol. It is also possible to use mixtures of the polyvinyl alcohols mentioned.

Further preferred polyvinyl alcohols are partially saponified, hydrophobized polyvinyl alcohols, which are obtained by polymer-analogous reaction, for example acetalization of the vinyl alcohol units with C1- to C4-aldehydes such as butyraldehyde. The proportion of hydrophobic units is preferably approximately 0.1 to approximately 10% by weight based on the total weight of the partially saponified polyvinyl acetate. The degree of hydrolysis is from approximately 80 to approximately 95 mol %, preferably approximately 85 to approximately 94 mol %, the Höppler viscosity (DIN 53015, Höppler method, 4% aqueous solution) from approximately 1 to approximately 30 mPas, preferably approximately 2 to approximately 25 mPas.

Most preferred are polyvinyl alcohols having a degree of hydrolysis of approximately 85 to approximately 94 mol % and a Höppler viscosity in approximately 4% aqueous solution of approximately 3 to approximately 15 mPas (Höppler method at 20° C., DIN 53015). The protective colloids mentioned are accessible using methods known to those skilled in the art.

The protective colloids are generally added during the polymerization in a total amount of approximately 1 to approximately 20% by weight, based on the total weight of the monomers.

Optionally, emulsifiers can be used in the polymerization, for example anionic and/or non-ionic emulsifiers, for example approximately 0.1 to approximately 2.0% by weight, based on the total weight of the comonomers. Examples of anionic emulsifiers are alkyl sulfates having a chain length of 8 to 18 carbon atoms, alkyl or alkylaryl ether sulfates having 8 to 18 carbon atoms in the hydrophobic radical and up to approximately 40 ethylene oxide or propylene oxide units, alkyl or alkylaryl sulfonates having 8 to 18 carbon atoms, esters and semiesters of sulfosuccinic acid with monohydric alcohols. Examples of non-ionic emulsifiers are C12-C14-fatty alcohol ethoxylates having a degree of ethoxylation of approximately 2 to approximately 20 ethylene oxide units.

The aqueous dispersions obtainable by the process according to the invention have a solids content of approximately 30 to approximately 75% by weight, preferably approximately 50 to approximately 60% by weight.

The polymerization is generally carried out up to a conversion of ≥95% by weight, preferably up to a conversion of approximately 95 to approximately 99% by weight, of the monomers which are liquid under polymerization conditions.

Subsequently, in a first phase of the post-treatment, the polymerization mixture is depressurized to a pressure of approximately 0.1 to approximately 5.0 bar abs., preferably approximately 0.1 to approximately 1.0 bar abs. In general, for this purpose, the polymerization mixture is transferred from the polymerization reactor to a post-treatment reactor (expansion vessel) under appropriate pressure. In the case of discontinuous operation (batch mode or semi-batch mode), the depressurization takes place after polymerization is complete. In the case of continuous polymerization, the polymerization mixture is continuously transferred to the post-treatment reactor.

The transport occurs due to the pressure difference between the polymerization reactor and the post-treatment reactor. The pressure difference is preferably from approximately 0.5 to approximately 5 bar. If the pressure difference decreases during the emptying of the reactor to such an extent that the emptying rate falls below the limit of the economic viability of the process, the pressure in the polymerization reactor can be kept constant or increased by introducing inert gas, for example pressurizing with nitrogen. The time period for this first phase of the post-treatment, the depressurization, is generally approximately 0.5 to approximately 1 hour.

During the depressurization of the polymerization batch, phase separation occurs between the polymer dispersion (liquid phase) and a gaseous phase which may include an inert gas and monomers which have not completely reacted during the polymerization and, potentially, by-products from the polymerization. The gaseous phase obtained during the depressurization can be withdrawn in a second phase of the post-treatment, the degassing, and optionally fed to the monomer recovery or fed to incineration. The time period for this second phase of the post-treatment, the depressurization, is generally 15 minutes to 1 hour.

In a third phase of the post-treatment, post-polymerization can be carried out using known methods, for example by post-polymerization initiated with a redox catalyst. Redox initiator systems, for example with the aforementioned oxidation initiators and reduction initiators, are used for post-polymerization. In general, an initiator system is used for the post-polymerization which is different from that used for the main polymerization. For post-polymerization, preference is given to redox combinations of hydrogen peroxide, sodium peroxide, potassium peroxide or t-butyl hydroperoxide with sodium sulfite, alkali metal formaldehyde sulfoxylates or ascorbic acid. The post-polymerization is generally carried out at temperatures of approximately 30° C. to approximately 60° C. and over a period of approximately 0.5 to approximately 1 hour. The components of the redox system may be added intermittently or metered in continuously. The amount of oxidation initiator and reduction initiator is generally approximately 0.01 to approximately 0.4% by weight each, based on residual monomer.

In a fourth phase of the post-treatment, volatile components can be removed by stripping, that is to say by passing over or preferably passing through inert entrainment gases such as air, nitrogen or steam. In general, the stripping is carried out at approximately 50° C. to approximately 80° C. and under a vacuum of approximately 0.1 to approximately 0.5 bar abs. and over one to two hours. In the case of post-treatment with steam, the procedure is preferably such that no more than approximately 5 to approximately 10% by weight of condensate, based on the polymer dispersion, is introduced.

Optionally, in a fifth phase, the polymer dispersion may be cooled, for example prior to its packaging with temperature-sensitive additives such as biocides. Preferably, the dispersion is cooled to a temperature of approximately 20° C. to approximately 40° C. The period of cooling is generally approximately 1 to approximately 2 hours.

Optionally, in a fifth phase, the polymer dispersion may be cooled, for example prior to its packaging with temperature-sensitive additives such as biocides. Preferably, the dispersion is cooled to a temperature of 20° C. to 40° C. The period of cooling is generally 1 to 2 hours.

After completion of the post-treatment, the polymer dispersion is transferred to a storage container.

When the polymer dispersion is transferred to the post-treatment reactor, during the first phase of the post-treatment, a liquid phase forms at the bottom of the post-treatment reactor. Preferably after formation of this liquid phase, particularly preferably approximately 10 to approximately 60 minutes after the start of the depressurization, the pump is switched on in the external circuit and the polymer dispersion is transported from the post-treatment reactor into the external circuit. The polymer dispersion is freed of coagulate in the filter internals in the external circuit. The polymer dispersion is analyzed in the downstream analytical device of the external circuit. In general, solids content, viscosity, VOC content, residual monomer content, particle size, molar mass (Mw), pH and redox potential are analyzed. Preferably, at least solids content and viscosity are analyzed.

The filtration and analysis of the polymer dispersion can take place in single phases of the post-treatment or in each case in every phase of the post-treatment of the polymer dispersion. Preferably, during the post-treatment of the polymer dispersion, polymer dispersion is continuously conveyed from the post-treatment reactor to the external circuit for filtration and analysis and then fed back into the post-treatment reactor.

The aqueous polymer dispersions can be used to produce polymer powders which are redispersible in water. For this purpose, the aqueous polymer dispersions, optionally after the addition of protective colloids as a spraying aid, are dried by using fluidized bed drying, freeze drying or preferably spray drying.

The aqueous polymer dispersions and the polymer powders redispersible in water can be used in the fields of application typical for these. For example, in construction chemical products, possibly in conjunction with hydraulical-setting binders such as cements, gypsum and water glass, for the production of building adhesives, in particular tile adhesives and composite thermal insulation adhesives, renders, troweling compounds, flooring compounds, grouts, jointing mortars and paints. Also as binders for coating agents and adhesives or as coating agents or binders for textiles and paper.

The following examples and FIG. 1 serve to further elucidate the invention:

FIG. 1 shows a simplified scheme for a device for carrying out the process with a polymerization reactor 1, a post-treatment reactor 2 and a circuit 3 which is equipped with a filter device 4, a pump 5 and an analytical device 6.

COMPARATIVE EXAMPLE 1

The following components were initially charged in a ca. 600 liter volume pressure reactor:
- 115 kg of water,
- 105 kg of a 20% by weight polyvinyl alcohol solution of a partially saponified polyvinyl alcohol having a degree of hydrolysis of 88 mol % and a Höppler viscosity of 4 mPas (Höppler method according to DIN 53015 at 20° C. and in 4% aqueous solution),
- 11 kg of a 10% by weight polyvinyl alcohol solution of a partially saponified polyvinyl alcohol having a degree of hydrolysis of 88 mol % and a Höppler viscosity of 25 mPas,
- 70 g of an 85% aqueous solution of formic acid,
- 80 g of a 10% aqueous iron ammonium sulfate solution.

The reactor was evacuated, then 220 kg of vinyl acetate were added to the aqueous initial charge. The reactor was then heated to 55° C. and subjected to an ethylene pressure of 32 bar (corresponding to an amount of 28 kg of ethylene).

The polymerization was started by adding 3% by weight aqueous potassium persulfate solution at a rate of 1.5 kg/h and by adding 1.5% by weight aqueous sodium hydroxymethanesulfinate solution (Bruggolite) at a rate of 1.5 kg/h. After observing the start of the polymerization, the internal temperature was increased to 85° C. over the course of 30 minutes. From the start of the reaction, the pressure was increased to 55 bar and maintained until a further 10 kg of ethylene had been metered in. The ethylene valve was then closed and the pressure allowed to drop. After reaching the polymerization temperature of 75° C., a further 55 kg of vinyl acetate were metered in over the course of 2 hours and the initiator rates were increased to a rate of 2.0 kg/h to 2.5 kg/h. After the vinyl acetate had been metered in, the initiators ran for a further 60 minutes to polymerize the batch.

The total polymerization time was ca. 5 hours.

The polymer dispersion had a temperature of 80° C. and was subsequently depressurized from the polymerization reactor at a pressure of 55 bar abs. into a post-treatment reactor (volume ca. 2000 liters) to a pressure of 0.8 bar abs. After 30 minutes, the dispersion was degassed over a period of 30 minutes by applying a pressure of 0.5 bar abs. After completion of the degassing, 500 g of a 10% by weight aqueous solution of tertiary-butyl hydroperoxide and 145 g of a 10% by weight aqueous solution of Bruggolite were added and the dispersion post-polymerized over a period of 2 hours. After completion of the post-polymerization, the polymer dispersion was stripped by passing through steam at 60 kg/h (6 bar abs, 158° C.) for 1 hour. The mixture was then cooled for a further 1.5 hours until the temperature of the polymer dispersion was 38° C.

After completion of the post-treatment steps, a 0.5 liter sample was taken from the post-treatment reactor and the solids content, viscosity, pH, redox potential and residual monomer content analyzed in the laboratory using conventional methods. The waiting time until the analytical results were available was ca. 1.5 hours.

After checking all the analytical results, the polymer dispersion was filtered while being pumped out of the post-treatment reactor by using a commercially available bag filter composed of nylon fabric having a mesh size of 500 µm. Due to the filtration, the hourly throughput was limited to 0.4 m$^3$/h.

The total cycle time of the post-treatment in the post-treatment reactor in comparative example 1 adds up to 7 hours.

EXAMPLE 2

Polymerization was conducted analogously to comparative example 1 in polymerization reactor 1 having a volume of ca. 600 liters. The total polymerization time was ca. 5 hours.

The polymer dispersion had a temperature of 80° C. and was subsequently depressurized from polymerization reactor 1 at a pressure of 55 bar abs. into the post-treatment reactor 2 to a pressure of 0.8 bar abs.

As shown in FIG. 1, the post-treatment reactor 2 was equipped with an external circuit 3, a pipeline which exits at the bottom of the post-treatment reactor 2 and is fed back in the circuit to the post-treatment reactor 2. In this external circuit 3 were installed a filter 4 (bag filter composed of nylon fabric with 500 µm mesh size), a pump 5 (eccentric screw pump) and an analytical unit 6 (determination of solids content via density measurement by Coriolis with an Endress+Hauser Proline 83i, viscosity measurement via torsional vibration with a Marimex VA-300 L-LT, pH and redox potential via commercial glass probes from Knick, and residual monomer content via NIR with an IRcube FT-IR from Bruker). The analytical values were monitored online via the process control system.

15 minutes after starting the depressurization, a liquid phase had formed at the bottom of post-treatment reactor 2 and the pump 4 was switched on and the polymer dispersion was pumped through the circuit at 1.2 m$^3$/h.

30 minutes after starting the depressurization, the dispersion was degassed by applying a pressure of 0.5 bar abs. over a period of 30 minutes. After completion of the degassing, 500 g of a 10% by weight aqueous solution of tertiary-butyl hydroperoxide and 145 g of a 10% by weight aqueous solution of Bruggolite were added and the dispersion post-polymerized over a period of 2 hours. After completion of the post-polymerization, the polymer dispersion was stripped by passing through steam at 60 kg/h (6 bar abs., 158° C.) for 1 hour. The mixture was then cooled for a further 1.5 hours until the temperature of the polymer dispersion was 38° C.

After cooling was complete, the pump 4 was switched on.

The polymer dispersion was free from coagulate and was mixed with 1200 g of biocide and pumped out into the storage container at an hourly throughput of 1.2 m$^3$/h.

The total cycle time of the post-treatment in example 2 was 5.5 hours.

The comparison of example 2 (5.5 h) with comparative example 1 (7.0 h) shows that the time for the production of a polymer dispersion is significantly shortened with the process according to the invention. The hourly throughput when pumping the polymer dispersion into the storage container is significantly increased due to the continuous filtration during the post-treatment in example 2 (1.2 m$^3$/h) compared to comparative example 1 (0.4 m$^3$/h).

The advantages of the process according to the invention consist in that the post-processing, filtration and analysis of the polymer dispersion are no longer carried out sequentially, but instead take place in parallel or simultaneously. This causes a significant shortening of the cycle times for the production of the polymer dispersion.

When using online analytical devices, the analysis of the polymer dispersion is accelerated and the risk of exposure to VOCs for the operating personnel is drastically reduced.

Surprisingly, soft gel particles, such as those from VAE dispersions, can also be separated off by use of filtration with the method according to the invention.

It is to be understood that the various embodiments described within this specification and as illustrated within the attached drawings are simply exemplary embodiments describing and illustrating the inventive concepts as defined within the claims. As a result, it is within the scope of this disclosure that the various embodiments described and illustrated herein may be combined with one another to make a polymer dispersion according to an embodiment of the disclosure as defined within the appended claims. In accordance with the provisions of the patent statutes, the present invention has been described to represent what is considered to represent the preferred embodiments. However, it should be noted that this invention can be practiced in other ways than those specifically illustrated and described herein without departing from the spirit and scope of this invention.

The invention claimed is:

1. A method for preparing a polymer dispersion, the method comprising the steps of:
   providing a polymerization reactor;
   obtaining a polymer dispersion by free-radically initiated emulsion polymerization of radically polymerizable ethylenically unsaturated monomers within the polymerization reactor;
   transferring the polymer dispersion obtained to a post-treatment reactor; and
   post-treating the polymer dispersion within the post-treatment reactor by physical and/or chemical methods and wherein the polymer dispersion in the post-treatment reactor is conveyed simultaneously to the post-treatment and to a circuit for filtration and analysis and then is subsequently fed back into the post-treatment reactor.

2. The method of claim 1, wherein the polymer dispersion is an aqueous polymer dispersion.

3. The method of claim 1, wherein the filtration is effected by automatic cleaning filters having mesh sizes of approximately 50 µm to approximately 1000 µm.

4. The method of claim 1, wherein the analysis comprises determining mean particle size, molar mass, solids content, viscosity, VOC content, residual monomer content, redox potential and/or pH.

5. The method of claim 4, wherein the analysis is measured using one or more analytical devices.

6. The method of claim 1, wherein the post-treatment comprises a first phase and a second phase;
   wherein in the first phase the polymerized polymer dispersion is depressurized to a pressure from approximately 0.1 bar to approximately 5.0 bar absolute; and
   wherein in the second phase a gaseous phase resulting from the depressurization during the first phase is withdrawn.

7. The method of claim 6, wherein the post-treatment further comprises a third phase and wherein in the third phase a post-polymerization occurs.

8. The method of claim 6, wherein the post-treatment further comprises a fourth phase and wherein in the fourth phase volatile components are removed by passing over or passing through inert entrainment gases.

9. The method of claim 6, wherein the post-treatment further comprises allowing the polymer dispersion to be cooled.

10. The method of claim 1, wherein the filtration and analysis is carried out in single phases of the post-treatment or in every phase of the post-treatment.

11. The method of claim 1, wherein the circuit is an external circuit.

12. The method of claim 11, wherein during the post-treatment of the polymer dispersion the polymer dispersion is conveyed continuously from the post-treatment reactor to the external circuit for filtration and analysis and is then subsequently fed back into the post-treatment reactor.

* * * * *